United States Patent [19]

Agulnek et al.

[11] Patent Number: 4,525,729
[45] Date of Patent: Jun. 25, 1985

[54] PARALLEL LED EXPOSURE CONTROL SYSTEM

[75] Inventors: Martin A. Agulnek, Sharon; Joseph M. Canter; Michael L. Reisch, both of Lexington, all of Mass.

[73] Assignee: Polaroid Corporation, Cambridge, Mass.

[21] Appl. No.: 481,830

[22] Filed: Apr. 4, 1983

[51] Int. Cl.[3] .................. G01D 15/14; H04N 1/30
[52] U.S. Cl. ............................. 346/154; 346/107 R; 346/160; 358/298; 358/300; 364/519
[58] Field of Search ............ 346/107 R, 160, 154; 358/283, 296, 300, 302; 364/519, 523; 354/5

[56] References Cited

U.S. PATENT DOCUMENTS

| | | | |
|---|---|---|---|
| 3,595,991 | 7/1971 | Diller | 178/5.4 EL |
| 3,803,631 | 4/1974 | Nucklos et al. | 346/35 |
| 4,229,086 | 10/1980 | Beery et al. | 354/5 |
| 4,229,750 | 10/1980 | Kawamura et al. | 346/107 R |
| 4,231,061 | 10/1980 | Freeman | 358/76 |
| 4,318,597 | 3/1982 | Kotani et al. | 354/5 |
| 4,342,504 | 8/1982 | Ebner | 354/7 |
| 4,378,568 | 3/1983 | Mir | 358/75 |
| 4,415,913 | 11/1983 | Diddens | 346/154 |
| 4,455,578 | 6/1984 | Fearside | 358/302 |

FOREIGN PATENT DOCUMENTS 2104266  3/1983  United Kingdom.

Primary Examiner—Thomas H. Tarcza
Attorney, Agent, or Firm—Edward S. Roman

[57] ABSTRACT

An electronic imaging system includes a linear LED array for recording on a photosensitive medium an image defined by electronic signal information in binary word format by simultaneously controlling the energization of all the LED's at a constant energy level in a series of intervals, each of which is timed differently to correspond to a different one of the data bits in the binary words which comprise the image defining electronic signal information. Each LED is energized during each interval as a direct function of the state of the data bit corresponding to that interval for that LED.

14 Claims, 4 Drawing Figures

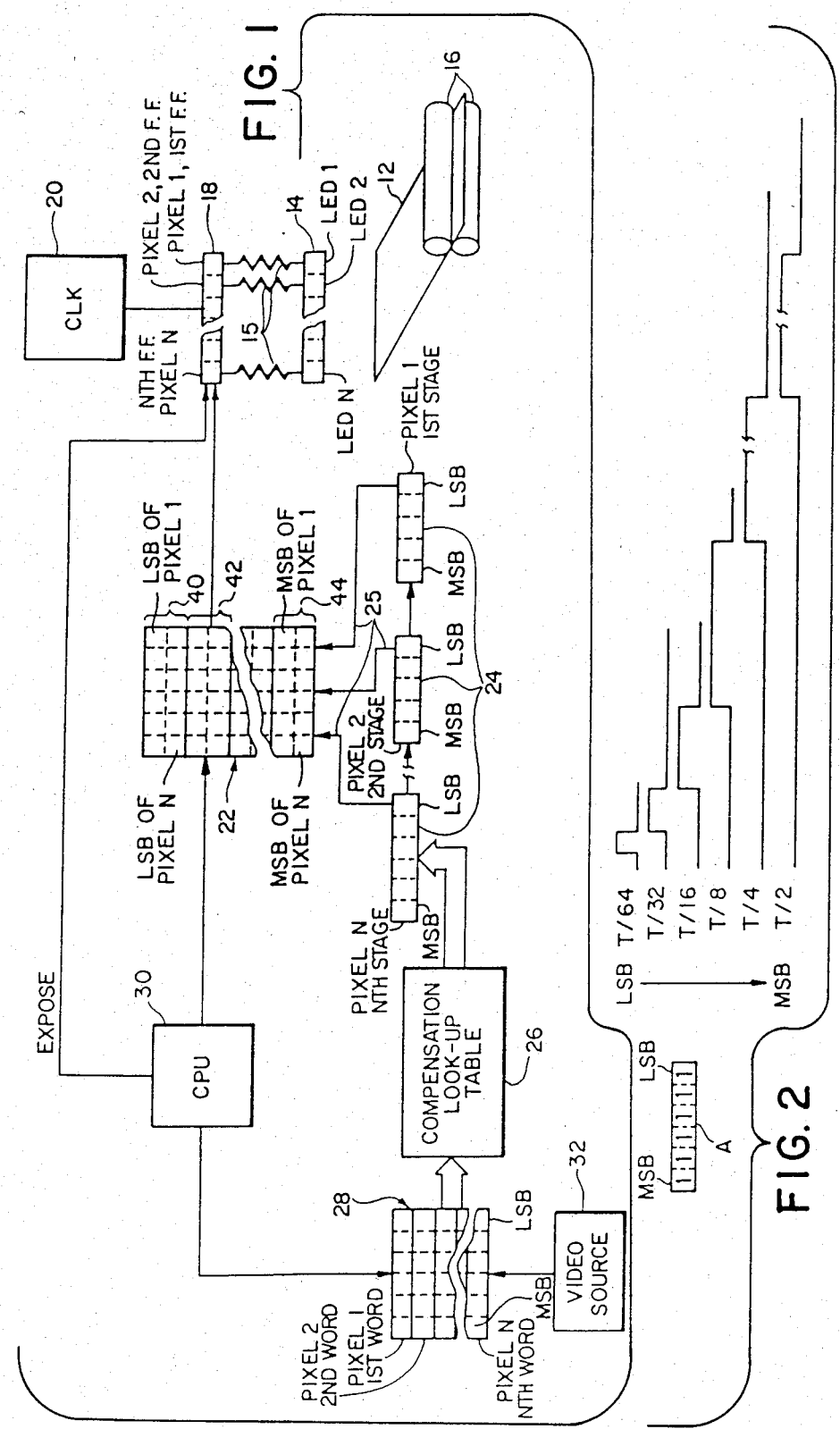

PARALLEL LED EXPOSURE CONTROL SYSTEM

BACKGROUND OF THE INVENTION

1. Field of the Invention

This invention relates generally to an imaging system for photographically recording electronic signal information and, more particularly, to an imaging system for recording on a photosensitive medium an image defined by electronic signal information in binary word format.

2. Description of the Prior Art

Light emitting diode arrays are well known in the art for recording an image on a photosensitive medium such as a film or paper or, alternatively, a photocopying receptor such as a selenium drum or a zinc oxide paper. In order to achieve high resolution, a large number of light emitting diodes are arranged in a linear array and means are included for providing a relative movement between the linear array and the photosensitive medium so as to affect a scanning movement of the linear array over the surface of the photosensitive medium. Thus, the photosensitive medium may be exposed to provide a desired image one line at a time as the LED array is advanced relative to the photosensitive medium either continuously or in a stepping motion. Each LED in the linear array is used to expose a corresponding pixel in the photosensitive medium to a value determined by image defining electronic signal information. In one conventional approach, the LED's are driven by a constant current and the exposure value is determined by controlling the time during which the LED is driven to an on condition. Thus, in this approach the LED is time modulated while the current and hence the light output from the LED are maintained at a substantially constant value.

The aforementioned time modulation technique may be implemented using a linear LED array by sequentially driving each LED on for a time interval proportional to the desired exposure value. The LED's may be sequentially driven in a well-known manner by a timer primed with the image defining electronic signal information in binary format so as to control the duration of the interval at which each LED is driven on via a fixed frequency clock. This sequential exposure scheme, however, requires too long a time to expose an entire image frame to be practical for many applications.

Therefore, it is a primary object of this invention to provide an apparatus and method utilizing an LED array for recording on a photosensitive medium an image defined by electronic signal information in a substantially shorter time period than is heretofore been accomplished.

It is a further object of this invention to provide an apparatus and method for recording with an LED linear array on a photosensitive medium an image defined by electronic signal information in binary word format by simultaneously controlling the energization of all the LED's in selected different time intervals so as to substantially shorten the overall exposure time required.

Other objects of the invention will be in part obvious and will in part appear hereinafter. The invention accordingly comprises a mechanism and system possessing the construction, combination of elements and arrangement of parts which are exemplified in the following detailed disclosure.

SUMMARY OF THE INVENTION

A system and method are provided for recording on a photosensitive medium an image defined by electronic signal information in binary word format. The system preferably comprises an array of spaced apart LED's each corresponding to a different pixel of the image to be recorded on the photosensitive medium. Means are provided for simultaneously controlling the energization of all the LED's at a substantially constant energy level in a series of intervals wherein each interval is timed differently to correspond to a different one of the data bits in the binary words which comprise the image defining electronic signal information. Each LED is energized during each interval as a function of the state of the data bit corresponding to that interval for that LED. In order to control the energization of the LED's, the binary words which define the determining exposure values for the respective pixels of the image to be recorded on the photosensitive medium are reorganized to provide an ordered sequence of binary words wherein each succeeding reorganized plurality of binary words comprises the next most significant data bit from all of the binary words which initially defined the image.

DESCRIPTION OF THE DRAWINGS

The novel features that are considered characteristic of the invention are set forth with particularity in the appended claims. The invention itself, however, both as to its organization and its method of operation, together with other objects and advantages thereof will be best understood from the following description of the illustrated embodiment when read in connection with the accompanying drawings wherein:

FIG. 1 is a schematic block diagram of the imaging system of this invention;

FIG. 2 is a diagrammatic view showing the ordered significance of the individual binary data bits which comprise a binary word defining the exposure value for a single pixel in the image to be recorded.

DESCRIPTION OF THE PREFERRED EMBODIMENTS

Figure 3A:
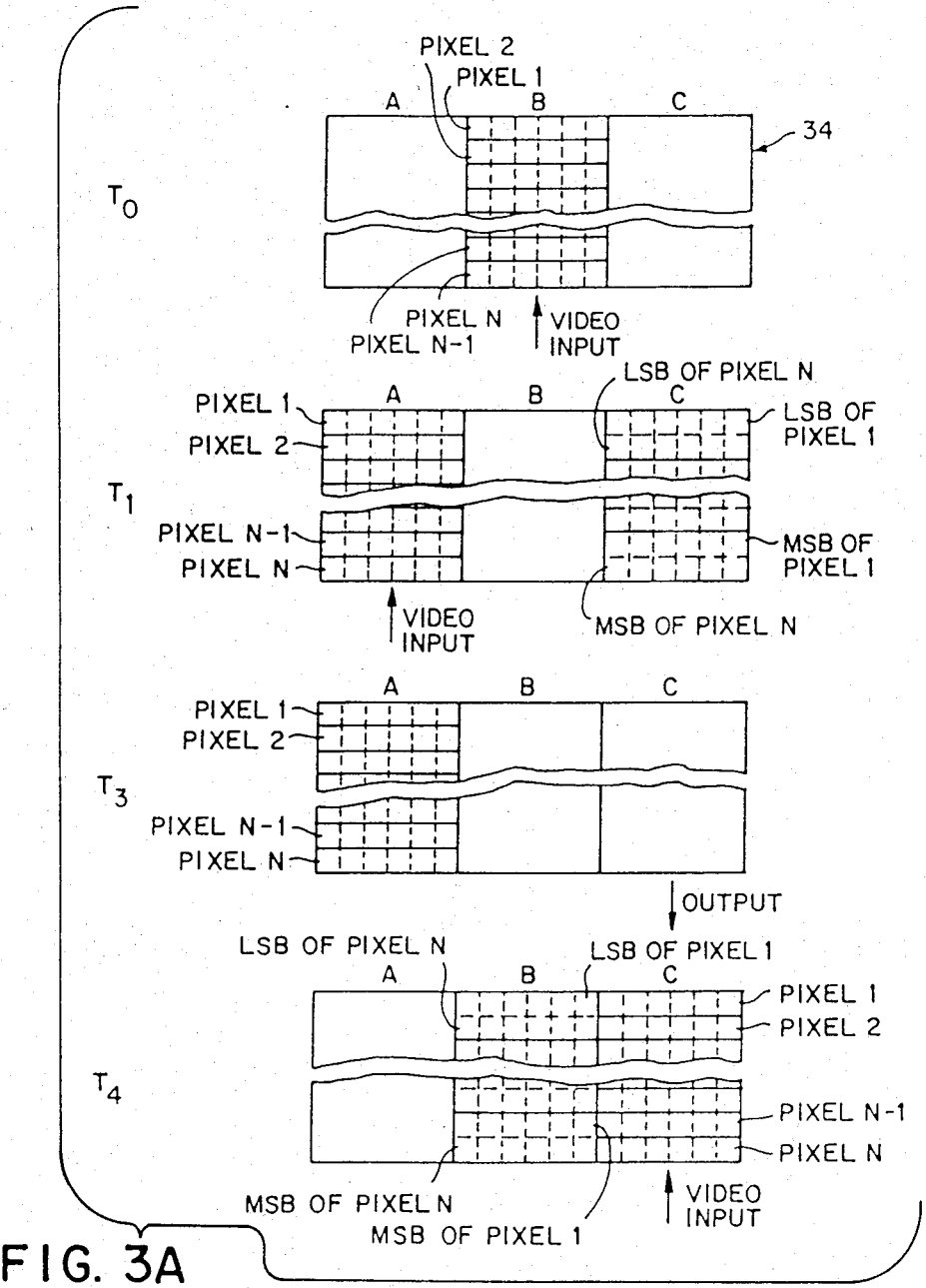
FIGS. 3A and 3B show an alternate arrangement for a portion of the system of FIG. 1 including a time sequence of operations.

Referring now to FIG. 1 there is shown the system of this invention for recording on a photosensitive medium 12 an image defined by electronic signal information. The source of the image defining electronic signal information may be any conventional video source as shown at 32 which provides the image defining electronic signal information which may be in any well-known form such as freeze frame video, computer generated data, or any other conventional form. An array of spaced apart discrete light sources 14 preferably comprising a plurality of LED's linearly aligned in side-by-side relationship are provided across the width of the photosensitive medium 12. As is well known, the LED's of the array 14 are stationed in light exposing relationship with respect to the photosensitive medium 12 so that upon energization of each LED there is exposed a corresponding pixel of the image to be produced on the photosensitive medium 12. As is readily apparent, after the LED array 14 exposes each line across the photosensitive medium 12, the LED array 14 is incrementally advanced relative to the photosensitive medium 12 to expose the next line. Such relative movement may be provided in a well-known manner by a pair of rollers 16 which advance the photosensitive medium 12 relative to the LED array 14.

The LED array 14 is energized or driven from a shift register 18, each output flip-flop of which corresponds to a pixel in the image to be produced on the photosensitive medium 12 and provides a driving output signal to a respective one of the LED's in the array 14 by way of a respective compensating resistor 15. Electronic signal information representing the image to be produced on the photosensitive medium 12 is in binary format with each binary data bit stored by a respective one of the flip-flops of the shift register 18 as schematically shown by the blocks corresponding to pixels 1 through n. The binary data bits in the shift register 18 during exposure are shifted through the compensating resistors 15 to drive the LED's of the array 14 respectively by a common clocking signal derived from a clock 20.

The input binary data bits to the shift register 18 are provided from a random access memory (RAM) 22 and are stored in the RAM 22 in a format that has been reorganized in the manner of this invention to be subsequently described herein. The binary data bits are shifted into the RAM 22 from another shift register 24 comprising a plurality of shift register stages (1 through N) serially connected with respect to each other. As is readily apparent from the drawing, the first stage of the shift register 24 operates to shift binary data bits pertaining to the first pixel, the second stage operates to shift binary data bits pertaining to the second pixel and so on down the line of serially connected stages until the last $N^{th}$ stage which operates to shift binary data bits pertaining to the $n^{th}$ pixel.

The shift register 24 is parallel input loaded from another random access memory (RAM) 28 by way of a compensation look-up table 26. The RAM 28 stores a series of binary words the first of which contains binary data bits pertaining to the first pixel of the image to be exposed on the photosensitive medium 12 and the last binary word of which contains binary data bits pertaining to the $n^{th}$ pixel in the image to be produced on the photosensitive medium 12. As previously discussed, the RAM 28 derives electronic signal information from a conventional video source 32. A central processing unit (CPU) 30 also provides an exposure control signal to the shift register 18 to control the instantaneous shift of data bits to drive the LED's of the array 14 while also operating to control the sequence of operations required to reorganize the binary format of the electronic signal information stored by the RAM 28 into the reorganized binary format of electronic signal information stored by the RAM 22 in the manner of this invention to be subsequently described herein.

Referring now to FIG. 2 there is shown at A an example of a binary word comprising six data bits representing the exposure value of one pixel in the image to be produced on the photosensitive medium 12. The six data bits of the binary word A are arranged in an ordered sequence from the least significant data bit (LSB) at the right-hand side of the binary word A to the most significant data bit (MSB) at the left-hand side of the binary word A. With all the data bits being at the assertive binary logic 1 signal level as shown in the drawing, there is defined the maximum exposure value for that particular pixel. It will be readily understood that six data bits is only described by way of example and that the actual number of data bits may be more or less than six.

Referring now to FIG. 1 in conjunction with FIG. 2 it can be seen that the video source 32 provides a stream of electronic signal information in binary word format to the RAM 28 and the RAM 28 operates to store a binary word comprising six data bits for each pixel arranged in sequence from pixel 1 through pixel n. It can also be now seen that the six data bits for each binary word are arranged in an ordered sequence from the least significant data bit on the right-hand side of the binary word to the most significant data bit on the left-hand side of the binary word in the manner illustrated by the example of FIG. 2.

The central processing unit 30 operates in the manner of this invention in conjunction with the shift register 24 to reorganize the binary words in the RAM 28 into a new binary format in the RAM 22 wherein the first plurality of binary words comprises all of the least significant data bits for all of the pixels with each succeeding plurality of binary words containing the next most significant data bit for all of the pixels until reaching the last plurality of binary words which contains all of the most significant data bits for all of the pixels 1 through n. This reorganization of data bits is accomplished by first parallel input loading the shift register 24 with the binary words from the RAM 28 in a manner such that the first stage contains the binary word pertaining to pixel 1 while the next stage contains the binary word pertaining to pixel 2 and so on in sequence until the last stage contains the binary word pertaining to the last or $n^{th}$ pixel. As is readily apparent, each binary word stored in each stage of the shift register 14 maintains the same ordered format from the least significant data bit on the right to the most significant data bit on the left as maintained in the RAM 28. The parallel input loading of data from the RAM 28 to the shift register 24 is clocked by the clock 20 as previously described.

The compensation look-up table 26 may be utilized to compensate the binary data bits from the RAM 28 for both the h/d characteristics of the film as well as any nonuniformities of the LED's of the array 14 and the compensating resistors 15 or any nonuniformities in the optical exposure paths for each of the LED's. After the binary words from the RAM 28 have been parallel input loaded to the shift register 24, a selected flip-flop in each of the stages of the shift register 24 is parallel ouput loaded to the RAM 22. Thus, it can be seen from FIG. 1 that the last flip-flop in each stage of the shift register 24 containing the least significant data bit (LSB) is selected to be parallel output loaded by way of lines 25 to provide the first plurality of words in the RAM 22 as shown at 40 containing the least significant data bits (LSB) for all the pixels 1 through n. Subsequent to this unloading, the shift register 24 is clocked to shift all the data bits by one flip-flop to the right thereby filling each previously unloaded selected flip-flop in each stage respectively with the next most significant data bit for all the pixels 1 through n. The selected flip-flops are thus filled with the next most significant data bits and then parallel output loaded to the RAM 22 so as to provide the next plurality of binary words in the RAM 22 as shown at 42 containing the next most significant data bits for all the pixels 1 through n. The process continues until the most significant data bit (MSB) for each pixel 1 through n has been shifted from left to right in each stage of the shift register 24 so as to occupy the selected flip-flop positions initially occupied by the least significant data bits (LSB's). Upon being shifted in the aforementioned manner, the most significant data bits (MSB's) are then parallel output loaded to the RAM 22 to provide the last plurality of binary words in the RAM 22 as shown at 44 comprising the most significant data bits (MSB) of all the pixels 1 through n. In this manner, the binary word format as shown in the RAM 28 wherein each binary word contains six data bits defining each pixel from the least significant data bit (LSB) to the most significant data bit (MSB) is reorganized to the format as shown in the RAM 22 wherein the first reorganized plurality of binary words 40 contains all of the least significant data bits (LSB) for all of the pixels 1 through n and each succeeding reorganized plurality of binary words contains the next most significant data bit for all the binary words 1 through n until the last of the reorganized plurality of binary words 44 which contains the most significant data bits for all the binary words 1 through n.

The reorganization of the binary words which comprise the image defining electronic signal information in the aforementioned manner permits all of the LED's, 1 through n to be simultaneously energized to expose the photosensitive medium 12 in a substantially shorter time than otherwise would be required. Thus, once all the binary data has been reorganized and the RAM 22 loaded, there is provided by the CPU 30 an exposure command signal to the shift register 18 to load the binary words from the RAM 22 to the shift register 18. Thus, the first plurality of binary words 40 stored in the RAM 22 which contains the least significant data bits (LSB) for all the pixels 1 through n is loaded into the shift register 18 so that the shift register 18 stores the least significant data bit for each pixel in the ordered sequence from pixel 1 at the right to pixel n at the left.

Once the shift register 18 is loaded in this manner, an exposure command signal is provided to drive the binary data bits through the resistors 15 and thereby drive respective ones of the LED's 1 through n. Thus, as is readily apparent, if the data bit for pixel 1 is at a binary logic 0 signal level, the LED 1 will not be energized and no exposure will occur at the pixel area of the photosensitive medium 12 opposite to the LED 1. Conversely, if the flip-flop of the shift register 18 corresponding to the pixel 1 registers a binary logic 1 signal level, then the binary logic 1 signal level will be driven to energize the LED 1 and to provide an exposure of a corresponding pixel area of the photosensitive medium 12.

The LED's 1 through n are energized at a constant current level to provide a constant light output so that the actual extent of the exposure of the photosensitive medium 12 depends upon the duration that each LED is energized. Since the first energization of all the LED's of the array 14 are controlled simultaneously by the least significant data bit of each corresponding pixel, it can be seen from FIG. 2 that $1/64^{th}$ of the time required for the maximum exposure is provided during the first energization period of the LED array 14. Thus, each LED 1 through n is turned either on or off for a fixed duration of time corresponding to $1/64^{th}$ of the time required to provide a maximum exposure of the photosensitive medium 12. After this exposure interval, the second plurality of binary words 42 from the RAM 22 containing the next most significant data bits for all the pixels 1 through n is loaded to the shift register 18 in the aforementioned manner and thereafter driven through the resistors 15 to control the energization of the LED's 1 through n of the array 14 for the next most significant duration which is equal to $1/32^{nd}$ the time required to achieve maximum exposure of the photosensitive medium 12. The process continues in this ordered sequence with the next succeeding plurality of binary words from the RAM 22 controlling the energization of the LED's 1 through n in the array 14 in a series of intervals progressively increasing from $1/16^{th}$ of the time required to achieve a maximum exposure of the photosensitive medium 12 to $\frac{1}{8}^{th}$ of the time required to achieve a maximum exposure of the photosensitive medium 12 to $\frac{1}{4}^{th}$ of the time required to achieve a maximum exposure of the photosensitive medium 12. In the last interval, the most significant data bits (MSB) of the $n^{th}$ plurality of words 44 stored in the RAM 22 are loaded to the shift register 18 and thereafter driven through the resistors 15 to control the energization of the LED's 1 through n of the array 14 for one-half the time required to achieve a maximum exposure of the photosensitive medium 12. Thus, there is provided a system for simultaneously controlling the energization of all of the LED's at a substantially constant energy level in a series of intervals wherein each interval is timed differently to correspond to a different one of the binary data bits in the binary words which comprise the image defining electronic signal information. Although the system has been described with an ordered sequence of exposures from the least significant data bit to the most significant data bit, it will be readily understood that the invention is not limited to that sequence and that any other sequence of exposures for the data bits could alternatively be utilized.

In addition, each LED is energized during each interval as a function of the state of the data bit corresponding to that interval for that LED. Therefore, if pixel 1 were defined by a binary word requiring a 0.5 maximum exposure value, it is now readily apparent that LED 1 would be energized only during the last interval when the plurality of binary words 44 from the RAM 22 containing the most significant data bits is driven from the shift register 18 through the resistors 15. During all of the other previous intervals, as shown in FIG. 2, the LED 1 would not be energized because the other data bits which make up the binary word pertaining to pixel 1 would provide binary logic 0 signal levels during the preceding intervals from $1/64^{th}$ the time required to achieve a maximum exposure of the photosensitive medium 12 through $\frac{1}{4}^{th}$ the time required to achieve a maximum exposure of the photosensitive medium 12.

The aforementioned procedure operates to expose only one line across the photosensitive medium 12; and, as is readily apparent, the position of the photosensitive medium 12 would then have to be incrementally advanced relative to the position of the array 14 as previously discussed in order to expose the next line of the image to be recorded thereon. The video source 32 would again provide the electronic image signal information in binary format to the RAM 28 and the process would be repeated in the aforementioned manner for the next succeeding line until the photosensitive medium 12 has been exposed to the entire image. It will also be readily understood that the LED array 14 may provide light only within a determinate spectral range and that other LED arrays could be arranged parallel thereto in a well-known manner to provide other line exposures within other spectrally limited ranges to ultimately provide a colored image on the photosensitive medium 12. Such techniques are well known and thus LED arrays which are adapted to emit light energy in the red, green and blue spectrums could be utilized to expose the photosensitive medium 12 and thereby provide a colored photographic image.

Figure 3B:
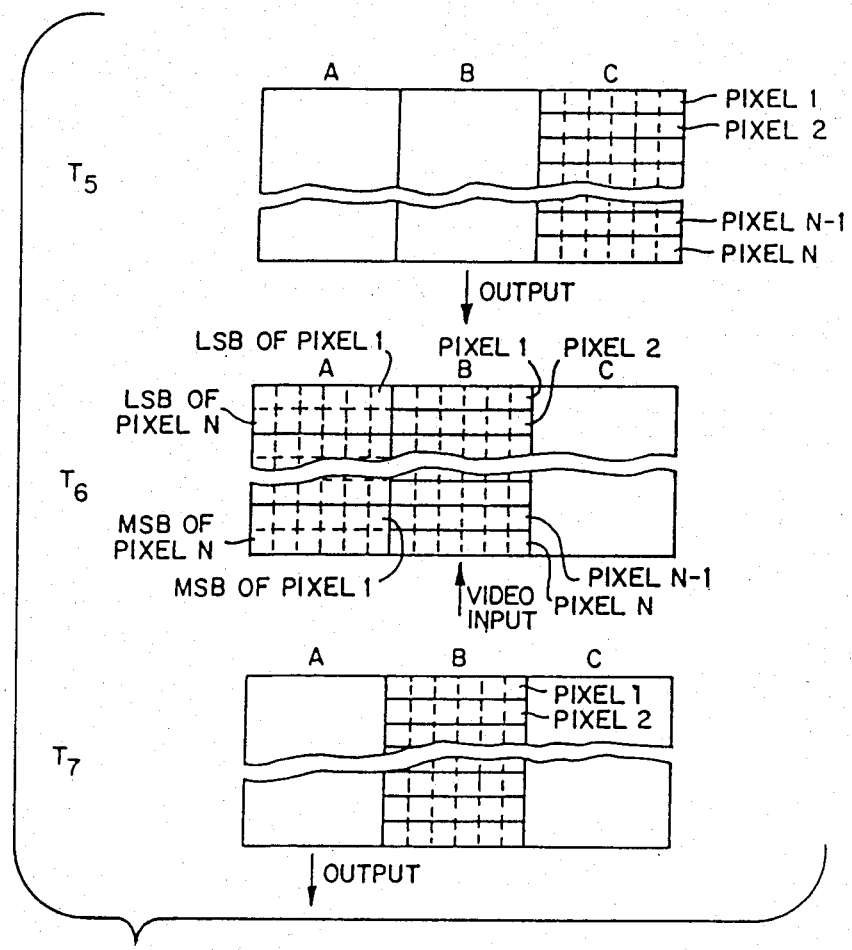

Referring now to FIGS. 3A and 3B, there is shown an alternate arrangement whereby the RAMS 28 and 22 of FIG. 1 may be replaced by a memory 34 comprising three buffer stages A, B and C. At time $T_0$ buffer stage B operates in the manner of RAM 28 to receive the electronic signal information in binary word format and to store such information in the ordered sequence from pixel 1 through pixel n. At time $T_1$, the binary words in buffer stage B are reorganized in the aforementioned manner into the reorganized format for storage in buffer stage C which operates in the manner previously described with respect to RAM 22. Simultaneously with the reorganization of the binary data, buffer stage A operates to receive the electronic signal information in binary word format from the video source 32 in the manner previously described with regard to the inputting of video information to the RAM 28. At time $T_3$ the binary words stored in the buffer C are outputted by way of the shift register 18 to the LED array 14 to expose the photosensitive medium 12 in the aforementioned manner. During this time the buffer stages A and B remain inactive. At time $T_4$ the binary words stored in buffer stage A are reorganized for storage in the aforementioned manner in buffer stage B while buffer stage C is simultaneously inputted with the electronic signal information from the video source 32. At time $T_5$ the reorganized binary words in buffer stage B are outputted to the shift register 18 to control the energization of the LED array 14 to expose the photosensitive medium 12 in the aforementioned manner while the remaining buffer stages A and C remain inactive. At time $T_6$ the binary words stored in the buffer stage C are reorganized for storage in the buffer stage A in the aforementioned manner while the buffer stage B is inputted with electronic signal information from the video source 32. At time $T_7$ the reorganized binary words in the buffer stage A are outputted to the shift register 18 to control the energization of the LED array 14 and thereby expose the photosensitive medium 12 while the remaining buffer stages B and C remain inactive. The process continues in this manner and enables the simultaneous inputting of electronic signal information from the video source 32 while the binary words inputted for the previous line are reorganized for display in the manner of this invention. Thus, the three stage buffer memory permits the simultaneous reorganization of data for one line while the next succeeding line is inputted from the video source 32 for storage in readiness for the next succeeding reorganization.

Other embodiments of the invention, including additions, subtractions, deletions and other modifications of the preferred disclosed embodiments of the invention will be obvious to those skilled in the art and are within the scope of the following claims.

What is claimed is:

1. Apparatus for recording on a photosensitive medium an image defined by electronic signal information in binary word format comprising:

an array of spaced apart discrete light sources each corresponding to a different pixel of the image to be recorded on the photosensitive medium; and means for simultaneously controlling the energization of all of said discrete light sources at a substantially constant energy level in a series of intervals wherein each interval is timed differently to correspond to a different one of the data bits in the binary words which comprise the image defining electronic signal information and each said light source is energized during each said interval as a function of the state of the data bit corresponding to that interval for that light source.

2. The apparatus of claim 2 wherein said control means comprises:

first memory means for storing first binary words each corresponding to a determinate exposure value for a respective pixel of the image to be recorded on the photosensitive medium and comprising a plurality of data bits arranged in an ordered sequence from the least significant data bit to the most significant data bit;

processing means for reorganizing said first binary words stored in said first memory means to provide second reorganized binary words sequentially ordered such that a first plurality of said reorganized binary words comprise the least significant data bit from all of said first binary words and each succeeding reorganized plurality of binary words comprises the next most significant data bit from all of said first binary words until the last of said reorganized plurality of binary words comprises the most significant data bits from all of said first binary words; and second memory means for storing said reorganized binary words.

3. The apparatus of claim 2 wherein said processing means comprises a shift register into which said first binary words are parallel input loaded and from which selected groups of data bits are parallel output unloaded to provide said reorganized binary words.

4. The apparatus of claim 2 wherein said first memory means is adapted to receive said first binary words from a source of electronic signal information during a select input time interval, said second memory means is adapted to output said reorganized binary words to enable the energization of said light source array during another select output time interval and said first and second memory means collectively comprise three buffer memory stages each stage of which sequentially operates to receive said first binary words from the source of electronic signal information while said first binary words previously stored in a second one of said buffer memory stages is reorganized to said second binary words for storage in a third one of said buffer memory stages.

5. The apparatus of claim 2 including a shift register for receiving said reorganized binary words from said second memory means and upon being fully loaded with each reorganized plurality of binary words from said second memory means, outputting said reorganized binary words to energize said light source array and clock means for clocking in said reorganized binary words from said second memory means to said shift register.

6. The apparatus of claim 2 wherein said light source array can expose the photosensitive medium in three distinct frequencies of radiant energy to provide a multicolored photograph.

7. The apparatus of claim 2 wherein said discrete light sources are arranged in a linear array and means are included for providing a relative movement between said linear array and the photosensitive medium so as to effect a scanning movement of said linear array over the photosensitive medium.

8. A method for recording on a photosensitive medium an image defined by electronic signal information in binary word format comprising the steps of:

positioning an array of discrete light sources each corresponding to a different pixel of the image and a photosensitive medium relative to each other such that energization of the array will operate to expose the photosensitive medium; and simultaneously controlling the energization of all of said discrete light sources at a substantially constant energy level in a series of intervals such that each interval is timed differently to correspond to a different one of the data bits in the binary words which comprise the image defining electronic signal information and each said light source is energized during each said interval as a function of the state of the data bit corresponding to that interval for that light source.

9. The method of claim 8 wherein controlling the energization of all of said discrete light sources comprises the steps of: storing in memory a first plurality of binary words each of which corresponds to a determinate exposure value for a respective pixel of the image to be recorded on the photosensitive medium and comprises a plurality of data bits arranged in an ordered sequence from the least significant data bit to the most significant data bit; reorganizing said first binary words stored in memory to provide second reorganized binary words sequentially ordered such that a first plurality of said reorganized binary words comprises the least significant data bit from all of said first binary words and each succeeding reorganized plurality of binary words comprises the next most significant data bit from all of said first binary words until the last plurality of said reorganized binary words comprises the most significant data bits from all of said first binary words, and storing in memory said reorganized binary words.

10. The method of claim 9 wherein said first binary words are reorganized by parallel input loading said first binary words into a shift register and then subsequently parallel output unloading selected groups of data bits from said shift register to provide said reorganized binary words.

11. The method of claim 9 wherein said first binary words are stored in memory during a first select input time interval, said first binary words stored in memory are subsequently reorganized to said second binary words and the next succeeding first binary words are stored in memory during the next succeeding first select input time interval, and said reorganized binary words are outputted from memory to enable the energization of the light source array during a succeeding second select output time interval.

12. The method of claim 9 further including the steps of clocking into a shift register said reorganized binary words from memory until said shift register is fully loaded with each plurality of reorganized binary words and thereafter clocking out said reorganized binary words to energize said light source array.

13. The method of claim 9 including the steps of exposing the photosensitive medium to three distinct frequencies of radiant energy from the light source array to provide a multicolored photograph.

14. The method of claim 13 wherein said discrete light sources are arranged in a linear array and there is further included the step of providing a relative motion between said linear array and the photosensitive medium so as to effect a scanning movement of said linear array over the photosensitive medium.

* * * * *